United States Patent [19]
Bombard

[11] Patent Number: 5,168,709
[45] Date of Patent: Dec. 8, 1992

[54] FUEL TANK DRYING AND VENTILATION SYSTEM

[75] Inventor: Walter W. Bombard, San Diego, Calif.

[73] Assignee: Bombard Associates, Inc., San Diego, Calif.

[21] Appl. No.: 679,304

[22] Filed: Apr. 2, 1991

[51] Int. Cl.$^5$ .......................... F17C 7/00; F17C 7/04; B08B 9/00
[52] U.S. Cl. .................... 62/48.1; 62/48.2; 34/77; 220/749
[58] Field of Search ................ 62/48.1, 48.2; 34/73, 34/74, 77; 220/749; 55/88, 89; 134/10, 12, 22.1; 141/45, 65, 82; 244/129.2, 135 R

[56] References Cited

U.S. PATENT DOCUMENTS

| | | | |
|---|---|---|---|
| 3,538,615 | 11/1970 | Führing et al. | 34/74 |
| 3,771,317 | 11/1973 | Nichols | 62/48.2 |
| 3,877,516 | 4/1975 | Zucchini | 34/77 X |
| 3,886,759 | 6/1975 | McNamee | 62/48.2 |
| 3,897,193 | 7/1975 | Kattan et al. | 220/749 X |
| 4,088,465 | 5/1978 | Uda et al. | 62/48.2 X |
| 4,249,387 | 2/1981 | Crowley | 62/48.2 |
| 4,292,744 | 10/1981 | Nabholz | 34/73 |
| 4,422,301 | 12/1983 | Watt et al. | 62/48.2 |
| 4,671,071 | 6/1987 | Sasaki | 62/48.2 X |
| 5,017,240 | 5/1991 | Brown | 62/48.2 X |
| 5,076,822 | 12/1991 | Hewitt | 62/48.2 X |

Primary Examiner—Henry A. Bennet
Assistant Examiner—Christopher Kilner
Attorney, Agent, or Firm—Charles H. Schwartz; Ellsworth R. Roston

[57] ABSTRACT

A system for drying and ventilating jet fuel tanks for reducing the fuel fume level from residual fuel in an emptied fuel tank operates in four modes. In a recirculation mode, a blower recirculates air through the tank in a closed loop. The blower suctions air from the tank and forces it through a vapor recovery unit having a cooling section with a refrigeration coil causing condensation of fuel vapor and a reheater section which reheats the air entering the tank to enhance evaporation of residual fuel. A heat recovery system circulates glycol/water mixture through a first heat recovery coil in the cooling section for absorbing heat from the air and a second heat recovery coil in the reheater section for returning the heat to the air. After fuel vapor has dried from the walls of the tanks, the system operates in a vacuum mode in which a vacuum hose, obtaining negative pressure through a pipe from the suction side of the blower, is used to remove residual puddles of fuel from the tank. After a hand-held vapor sensor determines that the fuel vapor has dropped to a safe level, a ventilation mode is used, circulating fresh air through the tank to the atmosphere, bypassing the vapor recovery unit. A temperature sensor monitors air returning to the tank. When the temperature approaches the flashpoint of the jet fuel vapor, an alarm is actuated. In a test mode, pressure is applied to the system to test it for leaks.

23 Claims, 7 Drawing Sheets

FUEL TANK DRYING AND VENTILATION SYSTEM

BACKGROUND OF THE INVENTION

1. Field of the Invention

This invention relates to a tank drying and ventilation system and, more particularly, to a system for drying and ventilating jet fuel tanks for reducing the fuel vapor level from residual fuel in an emptied fuel tank so that the fuel tank may be safely entered by maintenance personnel.

2. Description of the Prior Art

The components of a jet aircraft, including the fuel tanks, undergo considerable stress and flexure during flight. As a result, the fuel tanks often develop leaks. It then becomes necessary for maintenance personnel to enter a tank to repair the leaks. The tank must first be purged of all fuel (typically, Jet A jet fuel). However, after the fuel has been drained from the tank, residual fuel remains, producing a level of fuel fumes which makes the atmosphere within the tank unsafe. Various methods have been suggested for accelerating the drying time of large aircraft fuel tanks after the drainage of Jet A jet fuel. For example, Boeing Aircraft Company recommends fuel tank ventilating equipment that consists of a tank access port cover with a flexible hose adaptor connected to a commercially available blower. The exhaust of the blower must, however, be ventilated to a safe area due to the explosion hazard of the vapor of Jet A jet fuel. The vapor content of the exhaust from the tank is monitored, and the drying process is discontinued when the hazardous vapor level is less than 300 parts per million. This equipment takes too long, typical cycle time being twenty-four hours, and during the drying cycle, the hazardous exhaust situation must be considered as well as EPA regulations.

There are also some permanent hangar facilities in present use with large roof mounted ventilators, and the required adaptors to the fuel tanks. These installations are costly, limit fuel tank servicing to the hangar environment, and do not address the potential problems with EPA regulations. The systems generally exhaust the pollutants to the atmosphere, probably in violation of most such regulations.

In another context, U.S. Pat. No. 3,973,201 discloses a vapor recovery system for use with a fuel tank as it is filled with fuel. A refrigeration unit condenses fuel vapors and the portion of vapor which is not condensed is recirculated back through the refrigeration unit. The condensed fuel is returned to the tank. Periodically, the system is vented to the atmosphere through a canister filled with activated carbon. It will be recognized, however, that the system of this patent does not address the problem of reducing the fuel vapor level in an emptied fuel tank.

SUMMARY OF THE INVENTION

The system of the present invention greatly reduces the time required for drying jet fuel tanks. The level of fuel vapors in the tanks can now be brought to a safe level in less than one tenth of the time required by the prior art systems. Moreover, this is accomplished without venting noxious fumes into the atmosphere, making it feasible to stay well within EPA regulations. The system is easily contained within a compact portable unit, such as a trailer, making it possible to dry and repair the jet tanks at the same time, and at the same location, as routine servicing of the aircraft. It is no longer necessary to transport the jet planes to special hangars for drying the fuel tanks.

To these ends, the fuel tank drying and ventilation system of the invention establishes a closed loop air circulation path through the tank. A blower in the path suctions air from the tank, and air is passed through a vapor recovery unit which has a cooling section and a reheater section. The cooling section has a first cooling coil, which is part of a water-glycol heat recovery system, absorbing inlet air heat while precooling the inlet air to a temperature just above 32° F., and a second cooling coil, which is part of a refrigeration system, further cooling the incoming air well below 32° F., for condensing out fuel vapor components thereof. After the air is chilled in the cooling section, it is passed through the reheater section and redirected back through the fuel tank to evaporate residual fuel in the tank, the evaporation being enhanced by the heat content of the reheated air.

In the reheater section the chilled air first passes through a third coil, which is part of the water-glycol heat recovery system and to which the heat absorbed in the first coil is transferred to reheat the chilled air. The air then passes through a fourth coil which is the condenser or reheat coil of the refrigeration system and from which most of the heat of compression is transferred into the outlet air as it is heated to about 120° F.

An operator of the system uses hand-held hydrocarbon sensitive sensor means for monitoring the air leaving the tank to determine the level of fuel vapor therein so that the recirculation of dried, heated air through the tank may be terminated by the operator when the level of fuel vapor in the tank has reached a safe level. To avoid an explosion, the system includes temperature monitoring means coupled to alarm means to ensure that the temperature level of the heated air being redirected through the tanks stays below the flashpoint of the jet fuel vapor. The system also monitors the temperature of the cooling coil and the pressure developed in the path.

In order to reduce the time required to lower the fuel vapor to a safe level, a vacuum hose is connected to a condensate receiver coupled to the low pressure side of the blower. This creates vacuum suction in the hose which is used by an operator to remove puddles of liquid fuel which remain after all of the tank walls, including the top and bottom of the tank, have been dried by the circulation of the heated air. Removing minor puddles by vacuuming them rather than continuing the air circulation to first evaporate and then condense them dramatically reduces total tank drying time.

The system has four modes of operation. When the level of fuel vapor in the tank is above safe levels, the system is operated in a recirculation mode. Valve means are positioned to recirculate the air through the cooling section, the reheater section, and the fuel tank. After the tank walls have been dried by circulation of the heated air in the recirculation mode, the system is placed in a vacuum mode in which minor fuel puddles remaining in the tank are vacuumed by an operator manipulating the vacuum hose. When the level of fuel fumes within the tank drops to a safe level, the valve means are adjusted so that the system operates in a ventilation mode. The valve means open the system to draw ventilation air through the fuel tank, exhaust the air and close off flow through the vapor recovery unit. In order to test the integrity of the sealed system, a test mode is employed. The valve means closes the outlet from the tank and opens an air inlet to the blower so that the blower applies a test pressure to the path, and the pressure within the path is monitored.

BRIEF DESCRIPTION OF THE DRAWINGS

These and other objects, features and advantages of the invention will be more fully appreciated with reference to the accompanying drawings, in which.

DETAILED DESCRIPTION OF THE PREFERRED EMBODIMENT

Figure 1:
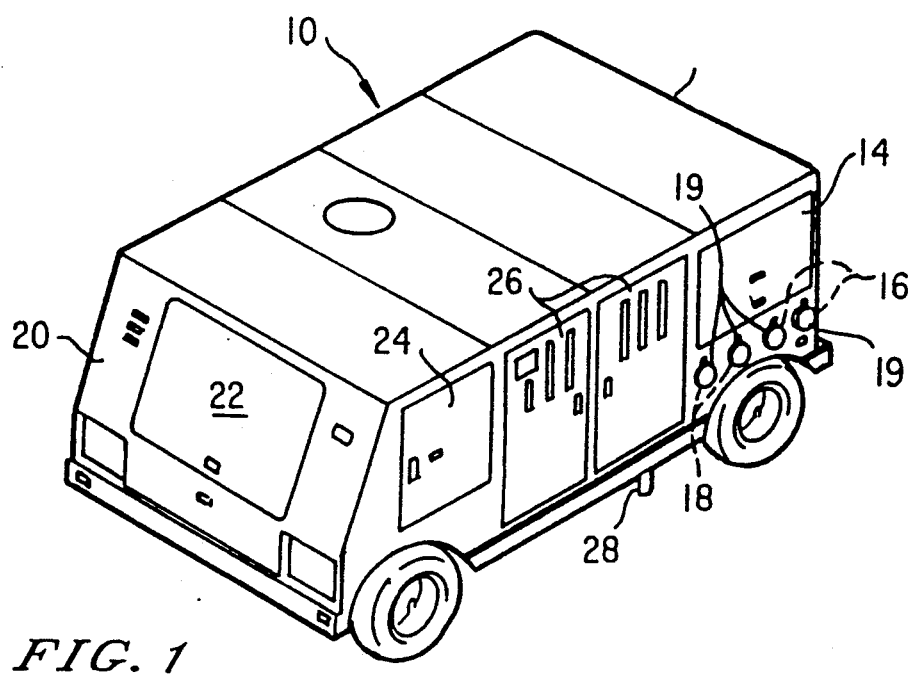
FIG. 1 is a perspective view showing a portable unit containing a system of the invention.

As shown in FIG. 1, a fuel tank drying and ventilation system of the invention may be compactly contained within a trailer enclosure 10 which is preferably no more than sixty inches in height to allow for clearance under an aircraft fuselage. The hoses used to couple the unit to a jet fuel tank are contained within storage compartments at the forward end 12 of the trailer, and fuel tank cover adaptors are stored on shelves in compartments accessed through doors 14 on the sides of the trailer. Just below these storage compartments, two inlets 16 and two outlets 18 extend from manifolds for connection to the hoses. Connection to either side allows freedom in placing the system relative to the aircraft. When not in use, inlets 16 and outlets 18 are sealed by caps 19. The main control panel is at the aft end 20 of the trailer and has a hinged cover 22. Side door 24 and doors 26 provide access to the electrical system and vapor recovery unit, respectively. A condensate drain 28 extends below the trailer. The actual configuration of the trailer and the orientation and location of the inlets and outlets are not critical to performance and may be changed as needed. If required, a large stationary unit may be used.

Figure 2:
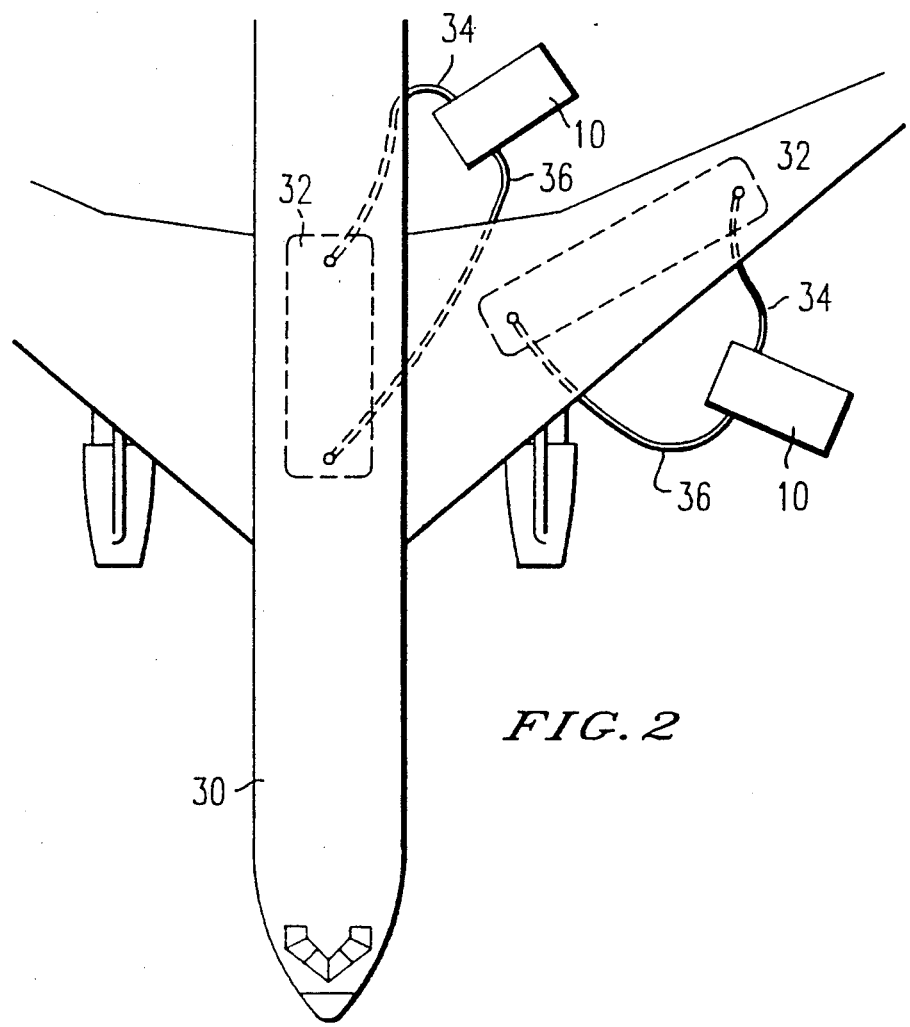
FIG. 2 is a plan view showing a jet aircraft having its fuel tanks serviced by systems of the invention.

FIG. 2 illustrates a pair of trailers 10 maneuvered into position adjacent to a jet aircraft 30 for servicing jet fuel tanks 32. As shown, an inlet hose 34 and an outlet hose 36, which are flexible fuel resistant six-inch duct hoses, couple each of the systems to the fuel tanks as will be explained more fully below. It is to be understood, however, that more than a single inlet and outlet hose may be used. For example, the system shown in FIG. 1 has four inlet and four outlet hoses.

Figure 3:
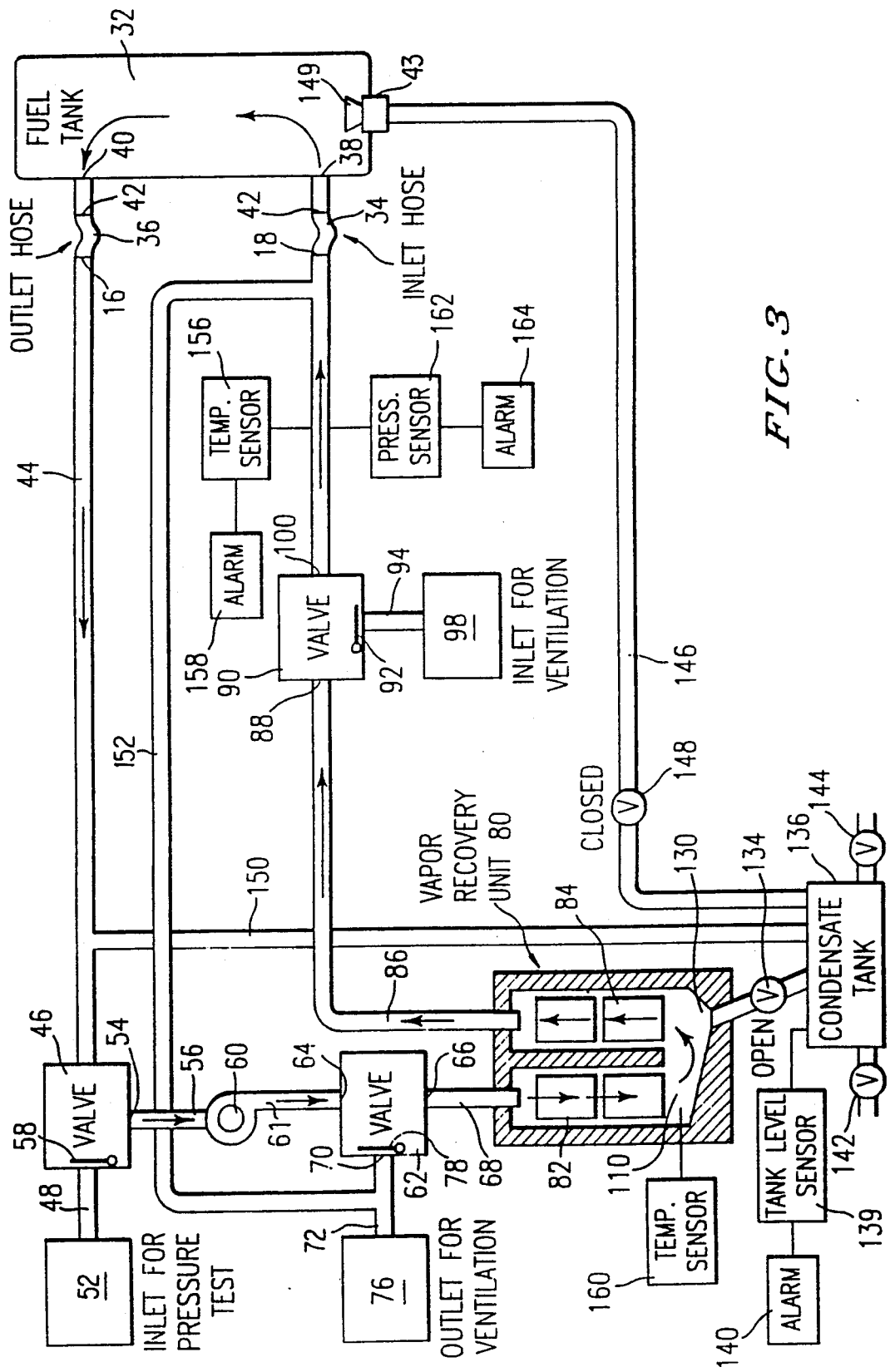
FIG. 3 is a schematic diagram of the system of the invention in a recirculation mode.
Figure 5:
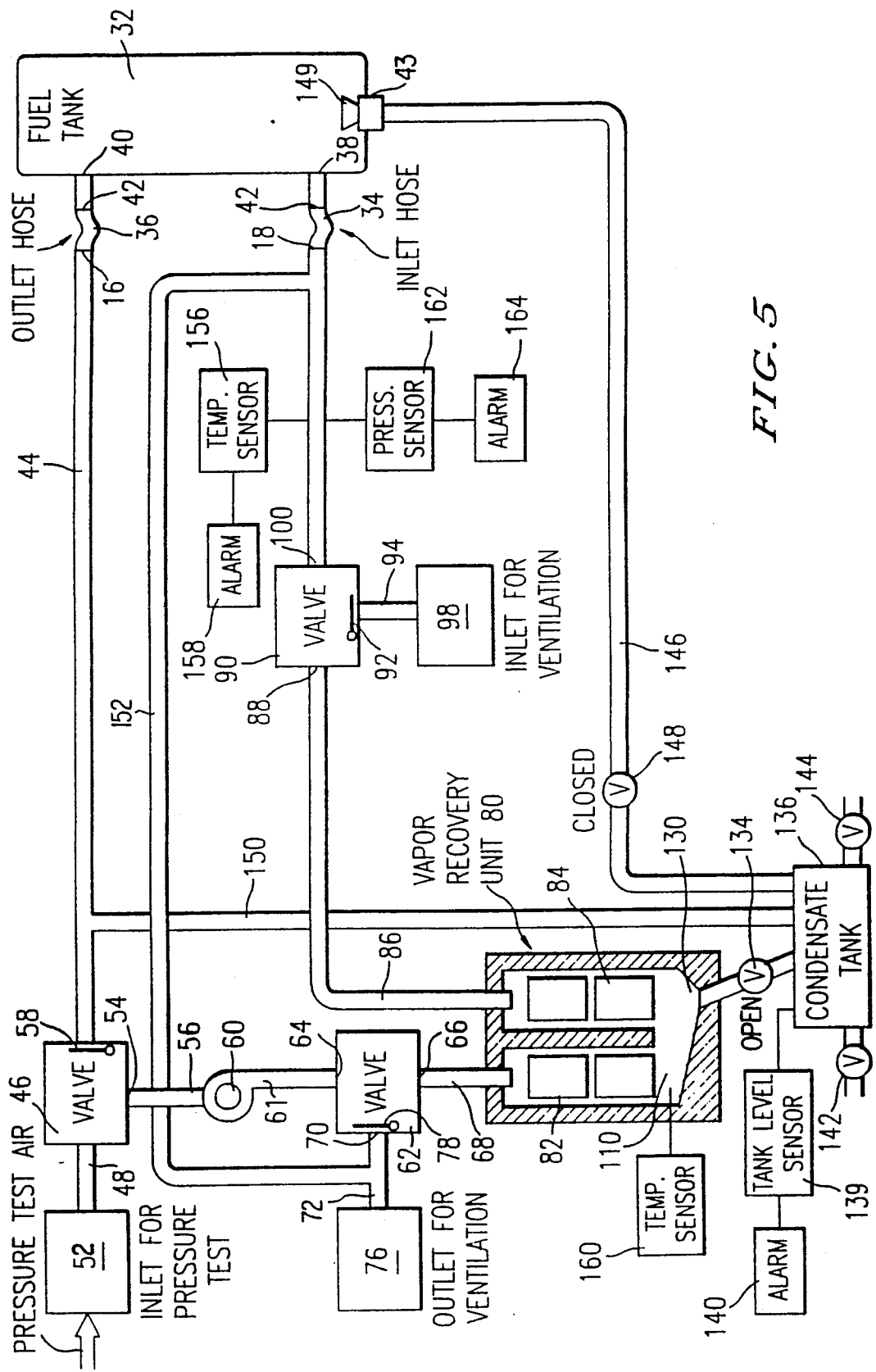
FIG. 5 is a schematic diagram of the system of the invention in a test mode.

Turning to FIG. 3, a system of the invention is coupled to ports 38 and 40 of a fuel tank 32 through hoses 34 and 36 and adaptors 42 as is known in the art. The system is coupled to the ports in a manner which is airtight so that the system may be kept sealed. The hoses are coupled respectively to a manifold inlet 16 and outlet 18 on one side of trailer 10. A duct 44 connects hoses 36 to a valve 46, which is a three-way valve with two valve bodies operating together as a valve member 58. Valve 46 has an inlet connected to duct 44, an inlet connected through duct 48 to a pressure test inlet 52, and an outlet 54 connected to a duct 56. Valve member 58 may be positioned to close the inlet from duct 48, as shown in FIG. 3, or to close the inlet from duct 44, as shown in FIG. 5.

A blower 60 exhausts air from fuel tank 32 and directs the air through a duct 61 to a valve 62, through an inlet 64. Valve 62, which is similar to valve 42, has an output 66 connecting the valve to a duct 68 and an outlet 70 connected through duct 72 to an outlet for ventilation 76. The valve includes a valve member 78 which either closes outlet 70, as shown in FIG. 3 or closes outlet 66, as shown in FIG. 6.

Duct 68 connects valve 62 to a vapor recovery unit 80 which will be described in more detail below. With valve 62 in the position shown in FIG. 3, air is directed by blower 60 into vapor recovery unit 80 within which the air flows through a cooling section 82 and then through a reheater section 84. From vapor recovery unit 80, the air is directed through duct 86 to the inlet 88 of a valve 90 of the same type as valves 46 and 62. The valve has another inlet 92 connected through a duct 94 to an inlet 98 for ventilation.

Figure 6:
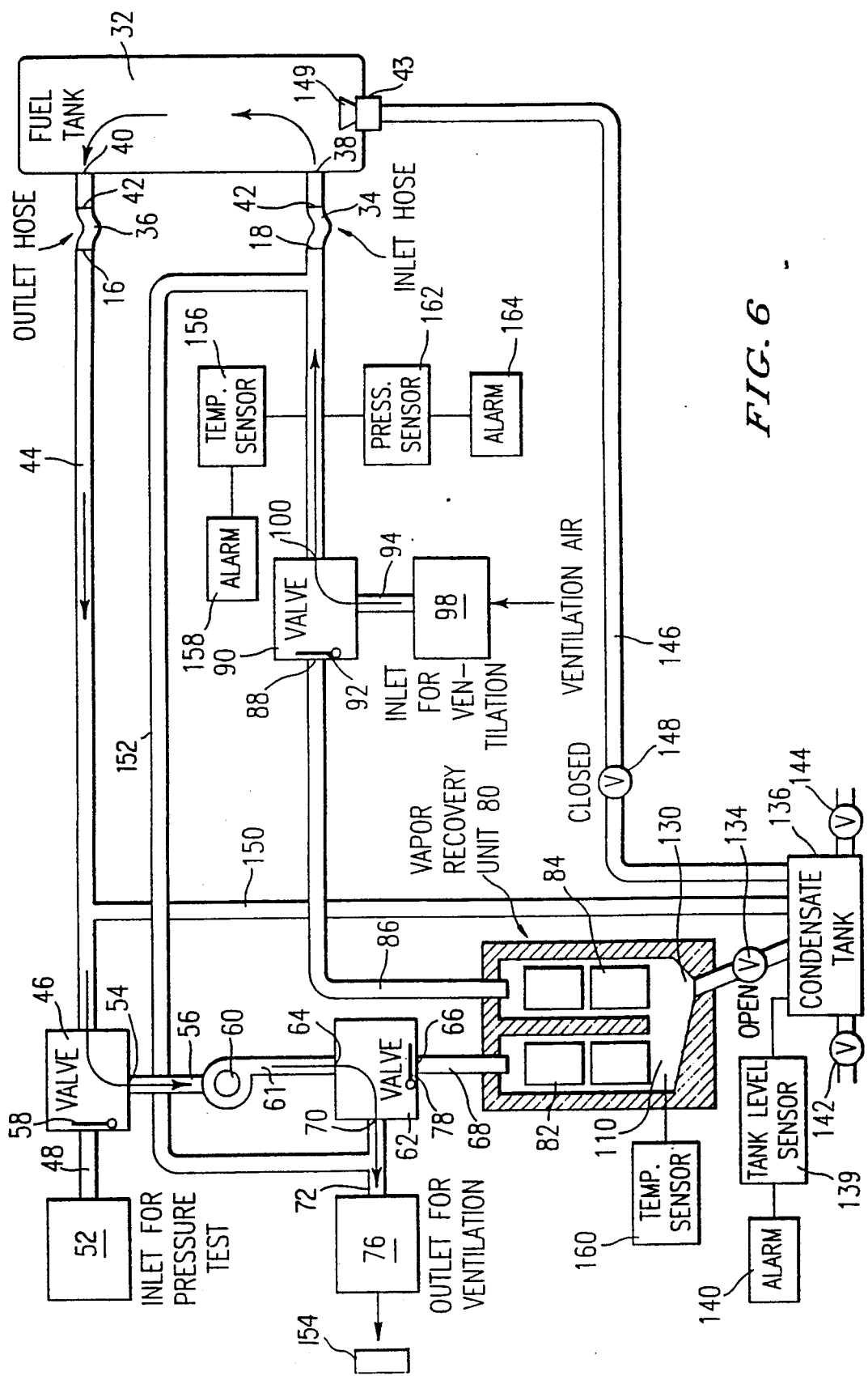
FIG. 6 is a schematic diagram of the system of the invention in a ventilation mode.

Valve 90 includes a valve member 92 which, as shown in FIG. 3, either closes off inlet 92, or as shown in FIG. 6, closes off inlet 88. Valve 90 has an outlet 100 through which heated air is returned through duct 102 and manifold outlet 18 to inlet hose 34 and port 38 of fuel tank 32. All of the ducts in the system are six-inch ducts.

Figure 7:
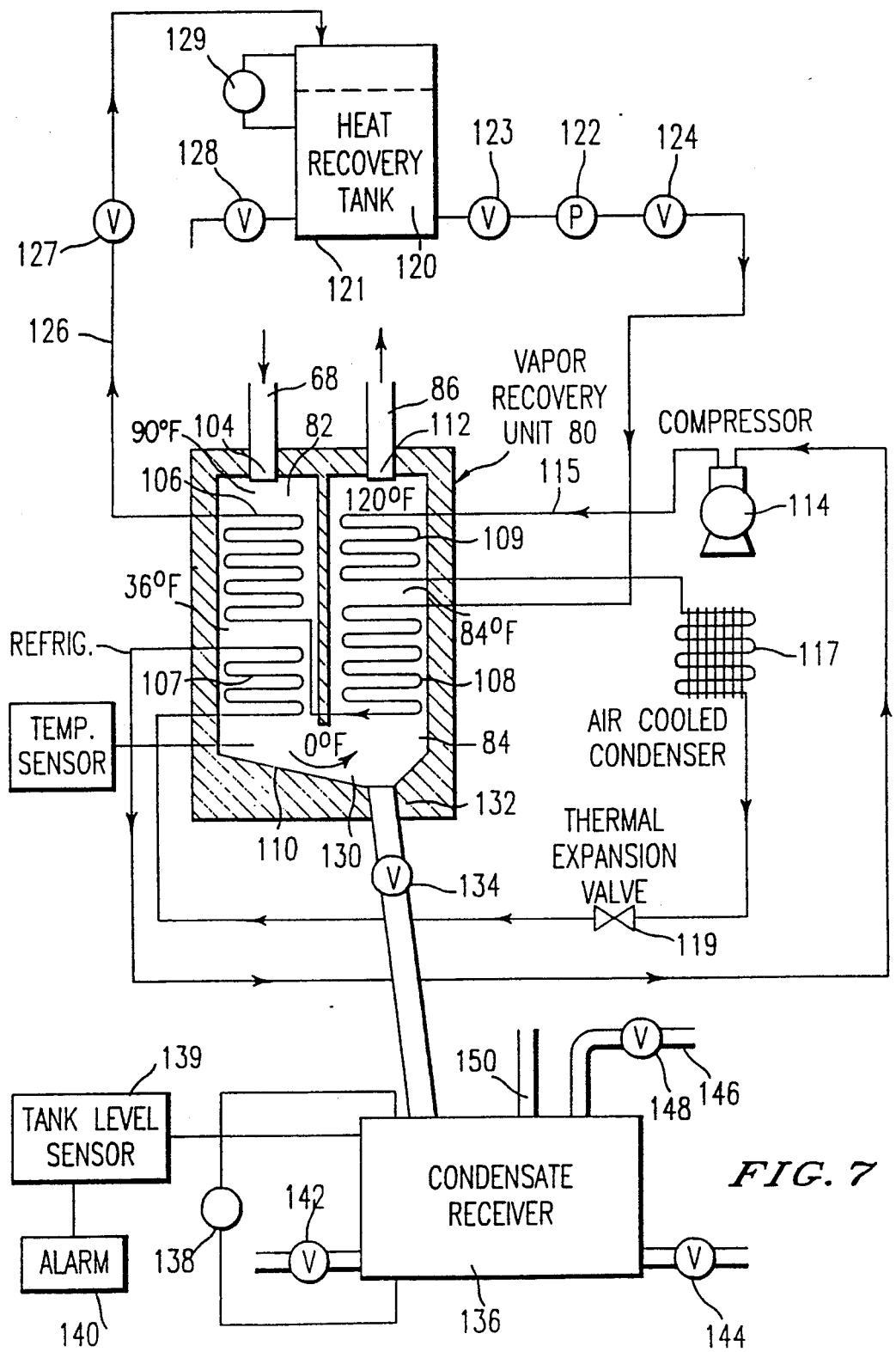
FIG. 7 is a schematic diagram of a vapor recovery unit of a system of the invention.

Vapor recovery unit 80, which is shown in greater detail in FIG. 7, is contained within an enclosure 81 and is connected to duct 68 through an inlet 104. Cooling section 82 includes a first cooling coil 106 which is part of a water-glycol heat recovery system, absorbing inlet air heat while cooling the inlet air to about 36° F., and a second cooling coil 107, which is part of a refrigeration system, further cooling the incoming air below 32° F. to 0° F. The air is then drawn through a connection section 110 at the bottom of the enclosure 81 to a reheater section 84. In this section, the air passes through a reheater coil 108 of the heat recovery system and a reheat coil 109 of the refrigeration system through an outlet 112 to duct 86. The air is reheated to about 84° F. by reheater coil 108 and is further heated to about 120° F. by reheat coil 109.

The refrigeration system includes a compressor 114 which directs refrigerant through a pipe 115 to reheat coil 109 where the air flowing through coil 109 absorbs heat from the coil. From reheat coil 109, the refrigerant flows through an air cooled condenser coil 117. Refrigerant from coil 117 is then directed through an expansion valve 119 which chills the refrigerant flowing through cooling coil 107 to, in turn, chill the air flowing through coil 107. The refrigerant is then returned to compressor 114.

The heat recovery system includes a heat recovery tank 121 which contains a glycol/water mixture 120, which contains enough glycol to keep the mixture from freezing in the 0° F. environment within vapor recovery unit 80 A pump 122 draws this mixture from tank 121 through a valve 123 and directs it through valve 124 and reheater coil 108 where heat is absorbed by the air. From coil 108 the mixture flows through pipe 125 to reheater coil 106 where heat is reabsorbed from the air.

The mixture then returns through pipe 126 and valve 127 to tank 121. Tank 121 has a drain valve 128 and a level sight glass 129.

As the air flows through cooling coil unit 107, jet fuel and water vapor components of the air condense when coming into contact with the chilled cooling coil. The condensate is collected in condensate receiver 130 formed at the bottom of vapor recovery unit 80 beneath cooling section 82 and is fed through drain 132 and valve 134 to condensate receiver 136. The level of condensate in tank 136 is monitored in a sight glass 138 and with a tank level sensor 139, which activates an alarm 140 when the condensate level is too high. Condensate may be drained from condensate receiver 136 through drain valves 142 and 144 through drain pipe 28.

Figure 4:
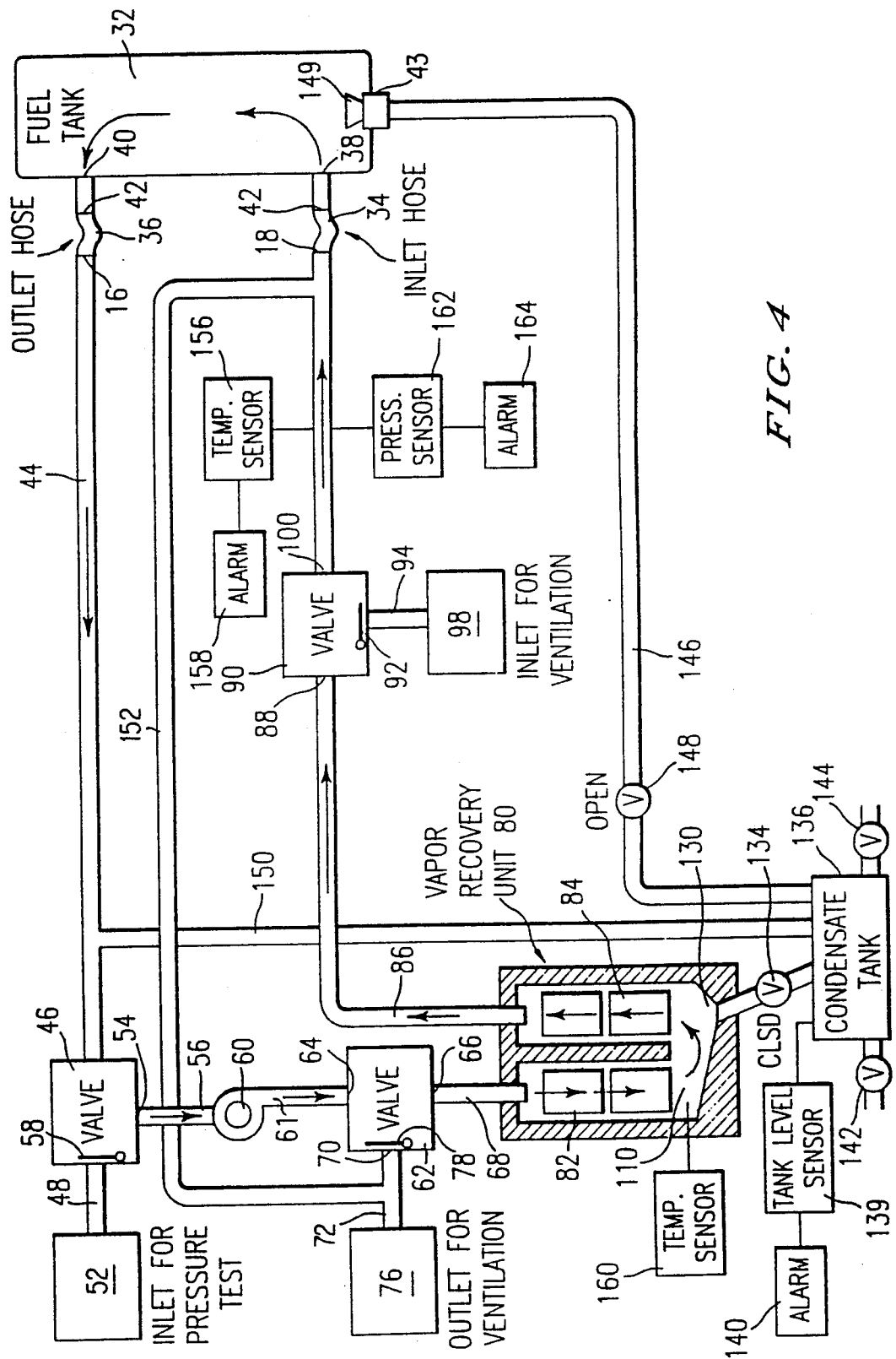
FIG. 4 is a schematic diagram of the system of the invention in a vacuum mode.

For operation of the system in the vacuum mode, as shown in FIG. 4, a two-inch vacuum hose 146 is connected between condensate receiver 136 and fuel tank 32 through one of the ports 43 provided in tank 32. A valve 148 is positioned in hose 146 and the hose terminates in a nozzle 149. In order to provide negative pressure within condensate receiver 136, a two-inch pipe 150 is connected between condensate tank 136 and duct 44 adjacent its connection to valve 46. Because this valve is on the suction side of blower 60, negative pressure is applied through pipe 150 to condensate receiver 136. A two-inch exhaust pipe 152 is connected between duct 102 near the coupling to hose 34 and duct 72 near the outlet for ventilation 76.

To place the system in the vacuum mode, condensate receiver is drained, the system is placed in the recirculation mode, and then valve 134 is closed and valve 148 is opened. An operator opens a port 43 in tank 32 to introduce vacuum hose 146 and nozzle 149 into the tank. The operator then vacuums any residual fuel puddles with vacuum nozzle 149, either by manipulating nozzle 149 from outside tank 32 or by entering tank 32 and applying nozzle 149 to the puddles within the tank. The liquid fuel is picked up with suctioned air by nozzle 149 and is then suctioned through hose 146 to condensate receiver 136 where the liquid fuel is separated from the suctioned air and collected in tank 136. The suctioned air then travels through pipe 150 to duct 44 near valve 46 and through valve 46 to blower 60. This air is then blown through duct 61, valve 62, vapor recovery unit 80, duct 86, and valve 90. Most of the suctioned air is then exhausted through pipe 152, duct 72 and ventilation outlet 76. The remaining suctioned air is returned to tank 32 through hose 34.

The operator uses a hand-held vapor sensor 154 to sense the vapor level in air passing through fuel tank 32 and leaving through outlet for ventilation 76. When the vapor level falls below a selected level in the range 300-500 parts per million, the vapor level is considered safe within tank 32. The system is then left in the ventilation mode as a workman repairs tank 32 from the inside.

As seen in FIG. 3-6, a temperature sensor 156 monitors the temperature of air in duct 102 feeding inlet hose 34. When the temperature reaches 130° F., the high temperature alarm 158 is activated to alert the operator to the need to shut down the system to insure that the temperature level of the heated air being directed through the tank does not reach the flashpoint of jet fuel vapor. In order to monitor the operation of blower 60, a pressure sensor 162 senses the pressure in duct 102. When a low pressure measurement indicates a malfunction of blower 60, an alarm 164 is activated. Another temperature sensor 160 measures the temperature in the cooling section 82 of vapor recovery unit 80 to monitor the operation of cooling coil unit 107.

Figure 8:
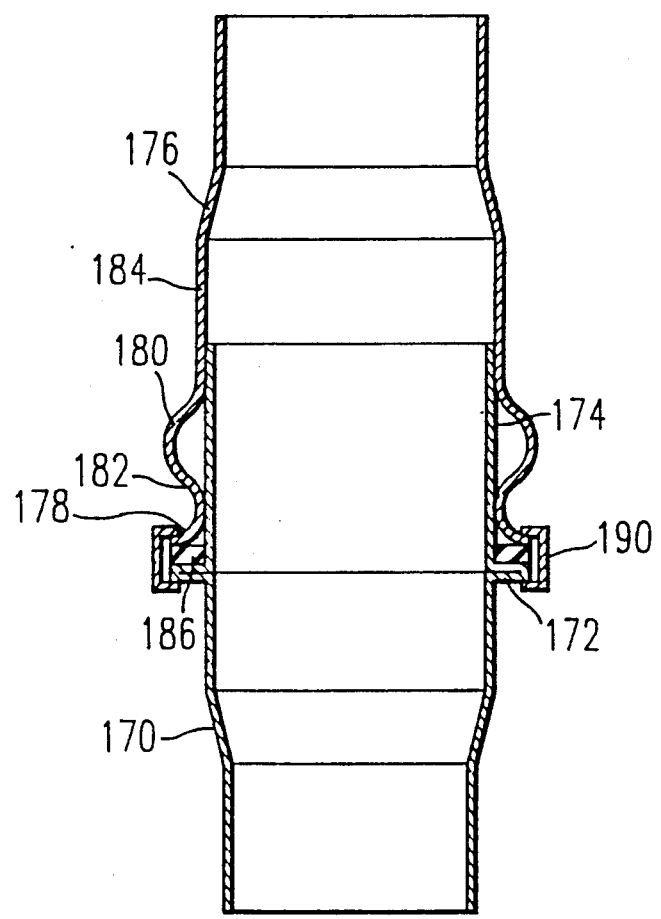
FIG. 8 is a section view showing the coupling of an inlet or outlet hose to the system of the invention.

As shown in FIG. 8, hoses 34 and 36 are coupled in an airtight manner to inlets 16 and outlets 18 of the system. Inlets 16 and outlets 18 terminate in a female coupling 176 which enlarges from the six-inch duct diameter to an outwardly curved lip portion 178, below a bead 180 forming a groove 182. A coupling nipple 170 is attached to each end of six-inch hoses 34 and 36 and has a coupling flange 172 extending outwardly therefrom at a point along a tubular end portion 174. A gasket 186 is positioned on flange 172. When the coupling is assembled, tubular end portion 174 of hose nipple 170 is slipped into female coupling 176; the outer surface of portion 174 then engages the inner surface of coupling 176 at the bottom of groove 182 and the inner surface of a tubular portion 184 of coupling 176. When a clamp 190 is applied over lip portion 178 and flange 172, gasket 186 forms an airtight seal as it is sandwiched between flange 172 and lip portion 178.

When fitting 176 is closed by a cap 19 it engages lip portion 178 with a gasket and fits over lip portion 178 to seal fitting 176. The hose nipple 170 at the other end of hoses 34 and 36 slips over a metal sleeve of adaptor 42 and is secured and sealed with a hose clamp.

The following table shows the operating condition of blower 60, compressor 114, valve 46, valve 62 and valves 90; 134 and 148 for the four modes of operation:

TABLE

|  | Recirculation Mode | Vacuum Mode | Ventilation Mode | Test Mode |
| --- | --- | --- | --- | --- |
| Blower | ON | ON | ON | ON |
| Compressor | ON | ON | OFF | OFF |
| Valve 46 | LEFT | LEFT | LEFT | RIGHT |
| Valve 62 | LEFT | LEFT | DOWN | LEFT |
| Valve 90 | DOWN | DOWN | LEFT | DOWN |
| Valve 134 | OPEN | CLOSED | OPEN | OPEN |
| Valve 148 | CLOSED | OPEN | CLOSED | CLOSED |

As shown in the Table, blower 60 is on in the recirculation, vacuum ventilation and test modes. Compressor 114 is on in the recirculation and vacuum mode, and off in the ventilation and test modes. The positions of the valves in the Table refer to the positions as shown in FIGS. 3-6. Thus valve 46 is left in the recirculation, vacuum and ventilation modes, and right in the test mode; valve 62 is left in the recirculation, vacuum and test modes, and down in the ventilation mode; and valve 90 is down in the recirculation, vacuum and test modes and left in the ventilation mode. Valves 46, 62, and 90 of the system are manually activated 3-way valves which are set by the operator into the appropriate position required for the mode of operation selected. While these valves may be actuated mechanically, solenoid actuated valves could be used.

When the system is in the recirculation mode, as shown in FIG. 3, blower 60 provides air mass flow through vapor recovery unit 80 and fuel tank 32 in a substantially closed loop cycle. The blower draws the air, including fuel vapor components, from fuel tank 32 and into cooling section 82 of vapor recovery unit 80 at a minimum of 1,000 standard cubic feet per minute. While one input hose 34 and one output hose 36 are illustrated in the disclosed embodiment, more can be used to reduce flow restrictions.

Air enters vapor recovery unit 80 from duct 68 at a temperature of about 90° F. and is cooled by heat recovery coil 106 down to about 36° F. Refrigeration coil 107 chills the vapor laden air to approximately 0° F. which condenses Jet A fuel vapor back into its liquid state. As the vapor free air leaves cooling section 82 and enters reheater section 84, heat recovery coil 108 reheats the air to about 84° F.; and the air is further heated to about 120° F. as it passes through reheat coil 109. By the time the air reaches fuel tank 32, its temperature falls to 110° F.+5° F. This heated air promotes evaporation of residual fuel in tank 32 and a quicker drying cycle. No electrical heaters are used as a safety measure. When the air is drawn out of fuel tank 32, its temperature will be about 90° F.

After the system has operated in the recirculation and vacuum modes, the level of fuel vapor is checked by the operator after the system is placed in the ventilation mode. Air leaving ventilation outlet 76 is monitored by a hand-held hydrocarbon sensitive sensor 154. A typical saturated Jet A vapor to air ratio is 3,000 parts per million (PPM) at room temperatures. When the vapor to air ratio falls to a level selected in the range 300-500 PPM, the tank is considered dry.

Temperature sensor 156 monitors the temperature of air entering fuel tank 32 to ensure that the flashpoint of saturated Jet A vapor (about 140° F.) is not approached. A maximum temperature in the range of 120°-130° F. is selected for control of alarm 158 which may be an alarm light or horn. If, for example, a temperature switch in sensor 156 signals that the temperature exceeds 130° F., alarm 158 will alert the operator to shut down the system.

During the recirculation mode, fuel vapor is condensed in cooling section 82 and drained into condensate tank 136 which will hold ten gallons of liquid. The condensate tank should be drained prior to drying a fuel tank for maximum capacity. While vapor recovery unit 80 is operating, the condensate will virtually be 100% Jet A fuel. Water vapor is frozen and adheres to refrigeration coil 107 while unit 80 is operating, but will melt, become water and drain into the condensate tank when unit 80 is turned off as will be the case in the ventilation mode. Refrigeration coil 107 is designed to be capable of holding frozen water vapor for fuel tank volumes of over 1,500 cubic feet 24 when saturated with water vapor (i.e., 100% relative humidity) at all normal ambient temperatures. Excessive air leaks in the system are to be avoided in the recirculation mode to prevent additional moisture from accumulating in the system which additional moisture would eventually freeze up the refrigeration coil 107 and prevent air flow.

Pressure sensor 162 enables the operator to monitor the system pressure. A pressure switch in the sensor signals alarm 164 to illuminate a fault lamp when the pressure drops below, for example, 1.5 inches of water to signify that the pressure is too low. The pressure sensor may, for example, be of a type associated with a four-inch orifice plate inserted in duct 102.

Since it is critical that air leaks be minimized during the recirculation mode, a static pressure test is conducted during the test mode to verify that the circulation path is substantially sealed—that is, that all tank inlet and outlet hoses, fuel tank adaptors and manifold caps are properly secured and gasketed as required for leak-tight connections, that all hose clamps are secure, that all fuel tank vents and covers are sealed or in place, and that no other system components are out of place.

The configuration of the system in the test mode is shown in FIG. 5. Valves 62 and 90 are in the same positions as in the recirculation mode, but valve 46 is shifted so that the main blower inlet (suction) is directed from the outside through inlet 52 and duct 48 and the normal inlet to blower 60 from duct 44 is closed. If the loop is sufficiently airtight, blower 60 will develop its maximum static pressure of, for example, over five inches of water. Pressure sensor 162 enables the operator to monitor blower pressure, and sensor 162 signals alarm 164 whether or not the result is satisfactory.

After fuel tank drying is complete (vapor at a selected level in the range 300-500 PPM or below), the system is operated in the ventilation mode, using blower 60 to continually ventilate the tank during maintenance. Valves 62 and 90 are shifted to circulate ambient air through tank 32, by-passing vapor recovery unit 80.

While the invention has been particularly shown and described with reference to a preferred embodiment, it will be understood by those skilled in the art that changes in form and details may be made therein without departing from the spirit and scope of the invention.

What is claimed is:

1. A fuel tank drying and ventilation system for reducing the fuel vapor level from residual fuel in an emptied fuel tank so that the fuel tank may be safely entered by maintenance personnel, comprising:

flow control means, when said system is in a recirculation mode, for establishing a closed loop air circulation path through said tank;

blower means in said path for suctioning air from said tank and through said path;

vapor recovery means in said path including cooling means in said path for cooling said air for condensing out fuel vapor components thereof and reheater means for reheating chilled air from said cooling means to enhance evaporation of residual fuel in said tank;

means for monitoring the temperature of air leaving said reheater means and means for activating alarm means when said temperature exceeds a temperature approaching the flashpoint of said fuel vapor.

2. The system of claim 1, further comprising hydrocarbon sensitive sensor means for monitoring said air leaving said tank to determine the level of fuel vapor therein.

3. A fuel tank drying and ventilation system, for reducing the fuel vapor level from residual fuel in an emptied fuel tank so that the fuel tank may be safely entered by maintenance personnel, comprising:

an outlet hose coupled to first port means on said tank;

first valve means having a first inlet coupled to said outlet hose, a second inlet, and an outlet;

blower means having an inlet coupled to said outlet of said first valve means and an outlet, said blower means suctioning air from said tank;

second valve means having an inlet coupled to said outlet of said blower means, a first outlet and a second outlet;

cooling coil means to chill said air to promote condensation of fuel vapor components therefrom;

means to collect condensate from said cooling coil means;

reheater means;

means for directing air from said first outlet of said second valve means through said cooling coil means and said reheater means;

third valve means having a first inlet coupled to said reheater means, a second inlet and an outlet; and an inlet hose coupling said outlet of said third valve means to second port means of said tank, said second port means being spaced from said first port means, whereby air from said inlet hose will flow through said fuel tank to said first port means and through a closed circulation path comprising said outlet hose, said first valve means, said blower means, said second valve means, said cooling coil means, said reheater means, said third valve means and said inlet hose.

4. The system of claim 3, said system being operable in a recirculation mode, wherein said first valve means has its first inlet open, its second inlet closed, and its outlet open, said second valve means has its inlet open, its first outlet open and its second outlet closed, and said third valve means has its first inlet open, its second inlet closed and its outlet open, whereby said blower means suctions air from said fuel tank through said first port means and said outlet hose, directs said air through said cooling coil means so that condensible fuel vapor components of said chilled air are separated by condensation, said chilled air is drawn through and reheated in said reheater means and said reheated air is drawn through said tank to evaporate residual fuel therein.

5. The system of claim 4, further comprising hydrocarbon sensitive sensor means for monitoring said air leaving said tank to determine the level of fuel vapor therein.

6. The system of claim 4, further comprising means for monitoring the temperature of air leaving said reheater means and means for activating alarm means when said temperature exceeds a predetermined temperature approaching the flashpoint of said fuel vapor.

7. The system of claim 3, said system being operable in a test mode, wherein said first valve means has its first inlet closed, its second inlet open and its outlet open, said second valve means has its inlet open, its first outlet open and its second outlet closed, and said third valve means has its first inlet open, its second inlet closed and its outlet open, whereby said path from said outlet hose is blocked and said inlet to said blower means is coupled to a test air inlet to said path so that said blower means applies air under pressure to said path, said system further comprising pressure sensor means for monitoring said pressure in said path.

8. The system of claim 3, said system being operable in a ventilation mode, wherein said first valve means has its first inlet open, its second inlet closed and its outlet open, said second valve means has its inlet open, its first outlet closed and its second outlet open, and said third valve means has its first inlet closed, its second inlet open and its outlet open, whereby said blower means draws ventilation air through said second inlet of said third valve means through said inlet hose, said second port means, said fuel tank, said first port means, said outlet hose and said first valve means, and blows said ventilation air through said second outlet of said second valve means to an outlet for ventilation.

9. The system of claim 3, wherein said cooling coil means comprises a refrigeration coil of a refrigeration system and wherein said reheater means comprises a reheat coil in said refrigeration system.

10. The system of claim 9, wherein said reheater means comprises a glycol/water heat recovery system including a heat recovery tank containing a glycol/water mixture, a first heat recovery coil in said cooling means, a second heat recovery coil in said reheater means, and pump means for circulating said mixture through said first heat recovery coil to absorb heat from air flowing through said cooling means and through said second heat recovery coil to return heat to air flowing through said reheater means.

11. The system of claim 3, further comprising condensate receiver means for collecting said condensed fuel vapor components through a drain valve from said vapor recovery means, pipe means coupling said condensate receiver to the suction side of said blower means, a vacuum line coupling said condensate receiver means to said fuel tank, vacuum valve means in said vacuum line, and means of placing said system in a vacuum mode with said drain valve closed and said vacuum valve open wherein an operator may vacuum puddles of fuel vapor from said tank through said vacuum line to said condensate receiver.

12. A fuel tank drying and ventilation system for reducing the fuel vapor level from residual fuel in an emptied fuel tank so that the fuel tank may be safely entered by maintenance personnel, comprising:

flow control means, when said system is in a recirculation mode, for establishing a closed loop air circulation path through said tank;

blower means in said path for suctioning air from said tank and through said path;

vapor recovery means in said path including cooling means in said path for cooling said air for condensing out fuel vapor components thereof and reheater means for reheating chilled air from said cooling means to enhance evaporation of residual fuel in said tank;

means for monitoring the pressure of air leaving said blower and means for activating alarm means when said pressure is below a predetermined level.

13. The system of claim 12, further comprising hydrocarbon sensitive sensor means for monitoring said air leaving said tank to determine the level of fuel vapor therein.

14. A fuel tank drying and ventilation system for reducing the fuel vapor level from residual fuel in a emptied fuel tank so that the fuel tank may be safely entered by maintenance personnel, comprising:

flow control means, when said system is in a recirculation mode, for establishing a closed loop air circulation path through said tank;

blower means in said path for suctioning air from said tank and through said path;

vapor recovery means in said path including cooling means in said path for cooling said air for condensing out fuel vapor components thereof and reheater means for reheating chilled air from said cooling means to enhance evaporation of residual fuel in said tank;

wherein said cooling means comprises a refrigeration coil of a refrigeration system and wherein said reheater means comprises a reheat coil in said refrigeration system.

15. The system of claim 14, further comprising hydrocarbon sensitive sensor means for monitoring said air leaving said tank to determine the level of fuel vapor therein.

16. A fuel tank drying and ventilation system for reducing the fuel vapor level from residual fuel in an emptied fuel tank so that the fuel tank may be safely entered by maintenance personnel, comprising:

flow control means, when said system is in a recirculation mode, for establishing a closed loop air circulation path through said tank;

blower means in said path for suctioning air from said tank and through said path;

vapor recover means in said path including cooling means in said path for cooling said air for condensing out fuel vapor components thereof and reheater means for reheating chilled air from said cooling means to enhance evaporation of residual fuel in said tank;

condensate receiver means for collecting said condensed fuel vapor components through a drain valve from said vapor recover means, pipe means coupling said condensate receiver to the suction side of said blower means, a vacuum line coupling said condensate receiver means to said fuel tank, vacuum valve means in said vacuum line, and means for placing said system in a vacuum mode with said drain valve closed and said vacuum valve open, wherein an operator may vacuum puddles of fuel vapor from said tank through said vacuum line to said condensate receiver.

17. The system of claim 16, further comprising hydrocarbon sensitive sensor means for monitoring said air leaving said tank to determine the level of fuel vapor therein.

18. A fuel tank drying and ventilation system for reducing the fuel vapor level from residual fuel in an emptied fuel tank so that the fuel tank may be safely entered by maintenance personnel, comprising:

flow control means, when said system is in a recirculation mode, for establishing a closed loop air circulation path through said tank;

blower means in said path for suctioning air from said tank and through said path;

vapor recover means in said path including cooling means in said path for cooling said air for condensing out fuel vapor components thereof and reheater means for reheating chilled air from said cooling means to enhance evaporation of residual fuel in said tank;

wherein, when said system is in a test mode, said system further comprises means for the application of a test pressure to said path and pressure monitoring means to measure the pressure within said path.

19. The system of claim 18, further comprising hydrocarbon sensitive sensor means for monitoring said air leaving said tank to determine the level of fuel vapor therein.

20. A fuel tank drying and ventilation system for reducing the fuel vapor level from residual fuel in an emptied fuel tank so that the fuel tank may be safely entered by maintenance personnel, comprising:

flow control means, when said system is in a recirculation mode, for establishing a closed loop air circulation path through said tank;

blower means in said path for suctioning air from said tank and through said path;

vapor recovery means in said path including cooling means in said path for cooling said air for condensing out fuel vapor components thereof and reheater means for reheating chilled air from said cooling means to enhance evaporation of residual fuel in said tank;

wherein, when said system is in a ventilation mode, said system further comprises means to open said path to draw ventilation air through said tank and exhaust said air through an outlet and to close off flow through said vapor recovery means.

21. The system of claim 20, further comprising hydrocarbon sensitive sensor means for monitoring said air leaving said tank to determine the level of fuel vapor therein.

22. The system of claim 14, wherein said reheater means comprises a glycol/water heat recovery system including a heat recovery tank containing a glycol/water mixture, a first heat recovery coil in said cooling means, a second heat recovery coil in said reheater means, and pump means for circulating said mixture through said first heat recovery coil to absorb heat from air flowing through said cooling means and through said second heat recovery coil to return heat to air flowing through said reheater means.

23. The system of claim 22, wherein said refrigeration system comprises a compressor, and wherein said reheat coil transfers heat from said compressor to air flowing through said reheater means.

* * * * *